United States Patent

[11] 3,617,770

[72] Inventors David E. Norton
Boulder, Colo.;
Joseph A. Lake, Jr., Lincoln Park, N.J.

[21] Appl. No. 790,247
[22] Filed Jan. 10, 1969
[45] Patented Nov. 2, 1971

[73] Assignee International Business Machines Corporation
Armonk, N.Y.

[54] SENSING CIRCUIT HAVING REGENERATIVE LATCHING CIRCUITS RESPONSIVE TO THRESHOLD DIFFERENCES IN BIASING VOLTAGES DERIVED FROM A PAIR OF DIFFERENTIALLY VARIABLE CURRENTS
6 Claims, 2 Drawing Figs.

[52] U.S. Cl. .......... 307/235,
307/243, 307/289, 328/117, 328/147, 328/148, 328/206
[51] Int. Cl. .......... H03k 5/20,
H03k 3/286
[50] Field of Search .......... 307/235,
291, 292, 236, 243, 244, 289, 296; 330/30 D;
328/246, 247, 146, 147, 148, 135

[56] References Cited

UNITED STATES PATENTS

| | | | |
|---|---|---|---|
| 3,422,366 | 1/1969 | Sewell .......... | 330/30 |
| 3,463,939 | 8/1969 | Sturman .......... | 307/235 |
| 3,501,648 | 3/1970 | Webb .......... | 307/235 |

*Primary Examiner*—John S. Heyman
*Assistant Examiner*—L. N. Anagnos
*Attorney*—Fraser and Bogucki

ABSTRACT: A sensing circuit in which currents in two different paths are differentially varied in response to bipolar input signals. A differential change in the currents sufficient to render the voltage drop across a pair of resistors in either current path approximately equal to the drop across the first one of a like pair of resistors in the other path results in the conduction of the second transistor in an appropriate one of a complementary pair of two-transistor latches to provide an output indication that an input signal at least equal to a predetermined minimum value has been sensed. The voltage drop across the second resistor of each pair establishes an operational threshold which is relatively insensitive to common circuit variations such as in the total current through the two paths, and the latches are regenerative in that conduction by the second transistor in either latch increases the current through the first one of the like pair of resistors to further bias the first transistor thereof into nonconduction.

PATENTED NOV 2 1971 3,617,770

INVENTORS
DAVID E. NORTON
JOSEPH A. LAKE, JR.
BY Fraser and Bogucki
ATTORNEYS

SENSING CIRCUIT HAVING REGENERATIVE LATCHING CIRCUITS RESPONSIVE TO THRESHOLD DIFFERENCES IN BIASING VOLTAGES DERIVED FROM A PAIR OF DIFFERENTIALLY VARIABLE CURRENTS

BACKGROUND OF THE INVENTION

1. Field of the Invention

The present invention relates to circuits for sensing signals of at least predetermined minimum value, and more particularly to circuits for sensing information signals of either polarity to the exclusion of noise and other unwanted signals during the readout of information storage devices.

2. Description of the Prior Art

Many situations exist in which electrical signals of information bearing content or other significance are generated or exist in the presence of unwanted signals such as noise and the like. In such situations arrangements must typically be provided for recognizing the presence of the desired signals to the exclusion of all others.

In a core memory, for example, the interrogation of a particular magnetic core may result in the generation of a signal on an associated sense line depending on the information state of the core. The interrogation process typically results in the generation of considerable noise which, if sensed, may result in the erroneous determination that an information signal is present. One way of overcoming this problem is to employ a sensing circuit which responds to all signals of value or amplitude at least equal to a predetermined threshold value while rejecting all others. Strobing techniques are employed to separate noise which is not coincident in time with the sought-after signals. Where the desired information signals appear in bipolar form, the sensing circuit must be capable of responding to signals of either polarity.

Conventional sensing circuits suffer from a number of limitations which may render then ineffective or useless for certain applications. One such limitation which becomes particularly significant in the sensing of core memory readout signals, for example, is the susceptibility of conventional circuits to wide variations in their operational thresholds due to drift and other circuit factors. Noise signals frequently have amplitudes which approach the range of information signal amplitudes. Accordingly, a decrease in the circuit threshold due to factors such as power supply variations may result in the false sensing of a noise signal. Similarly, an increase in the threshold may result in failure to recognize an information signal of relatively low amplitude.

Conventional sensing circuits are often deficient in other respects including their ability to respond in positive fashion to signals of adequate amplitude, even though the operational thresholds are maintained at a desired level. Thus switching elements may fail to respond to information signals of adequate amplitude but of relatively short duration, allowing the signals to occur without the generation of corresponding output indications. Measures taken to improve the performance of sensing circuits are usually accompanied by considerable expense and circuit complexity, factors which are particularly significant when it is considered that many such circuits may be required to sense the readout signals from a single memory arrangement.

Summary of the Invention

In accordance with the invention, sensing circuits are provided which are relatively simple in their construction, yet operate in positive fashion using operational thresholds which are relatively insensitive to common circuit variations such as perturbations in the power supply. In one preferred arrangement for sensing bipolar input signals, the currents flowing through two different paths from a constant current source are differentially varied by the incoming signals, a signal of given polarity providing an increase in the current flowing in a first one of the paths by an amount determined by the signal amplitude and a decrease in the current flowing in the second path by a substantially equal amount. Input signals of opposite polarity provide similar variations in the current but of opposite sense, the current in the second path increasing and the current in the first path decreasing.

In accordance with the invention, changes in the current flowing in the two different paths are utilized to provide variable biasing voltages via a pair of resistors serially coupled in each of the current paths. The voltage drop across the first resistor of each pair provides a biasing voltage which is proportional to and varies directly with the current in the associated path. The total voltage drop across both resistors of each pair also provides a biasing voltage proportional to and varying directly with the current in the associated path. The difference between the voltage drop across the first resistor of one pair and the drop across both resistors of the other pair for equal currents defines an operational threshold in terms of the differential change in the current required to render the voltage drops at least equal to one another. Input signals having an amplitude sufficient to provide such a differential change change in the currents are sensed to the exclusion of input signals of lesser amplitude. The resistors are constant in value, and the threshold provided by the various voltage drops thereacross remains constant in the absence of common mode variations such as in the total current through the two different paths. Should such a common mode variation occur, the resulting variation in the threshold is linear. The effects of such a threshold variation moreover are negated by the transistors employed to differentially vary the currents. Thus if the total current in the two different paths increases, the resulting increase in the gain of the transistors provides a corresponding increase in the differential variation of the currents for an input signal of given value.

Input signals of sufficient amplitude are sensed in accordance with the invention using a pair of bistable devices cross-coupled between the opposite resistor pairs so that each is responsive to the voltage drop across the first resistor of one resistor pair and the total voltage drop across both resistors of the other pair. Each bistable device which is normally biased into a first state is operative to be biased into a second state whenever the two voltage drops to which it is responsive attain a predetermined relationship. Each bistable device may comprise a pair of transistors, a first one of which is biased by the voltage drop across the first resistor of one resistor pair and the second one of which is biased by the voltage drop across both resistors of the other resistor pair. In the absence of an input signal of sufficient amplitude the voltage drop across the pair of resistors exceeds the drop across the one resistor and the first and second transistors are respectively biased into conduction and nonconduction. When the voltage drops become at least equal in response to an input signal of sufficient amplitude however, the second transistor begins to conduct and the first transistor beings to turn off. In accordance with a feature of the invention the two transistors operate in regeneration fashion. The conduction path of the second transistor includes the one resistor, and as conduction of the second transistor increases the resulting increase in the voltage drop across the resistor operates to further bias the first transistor into nonconduction.

In accordance with still further aspects of the invention, each bistable device may be coupled to bias an associated transistor into conduction providing an output signal whenever the second transistor of the bistable device conducts. The bistable device moreover may be rendered inoperative during periods when very large noise or other unwanted signals may be present at the circuit input by coupling the emitters of the first and second transistors thereof to a common terminal. In the absence of a strobe signal the voltage at the common terminal is high and neither transistor can conduct. During time intervals in which signals to be detected are most likely present while noise signals of large amplitude are not, a strobe signal is applied to lower the common terminal voltage enabling one or the other of the transistors to conduct.

BRIEF DESCRIPTION OF THE DRAWINGS

The foregoing and other objects, features and advantages of the invention will be apparent from the following description of a preferred embodiment of the invention, as illustrated in the accompanying drawings in which.

DETAILED DESCRIPTION

Figure 1:
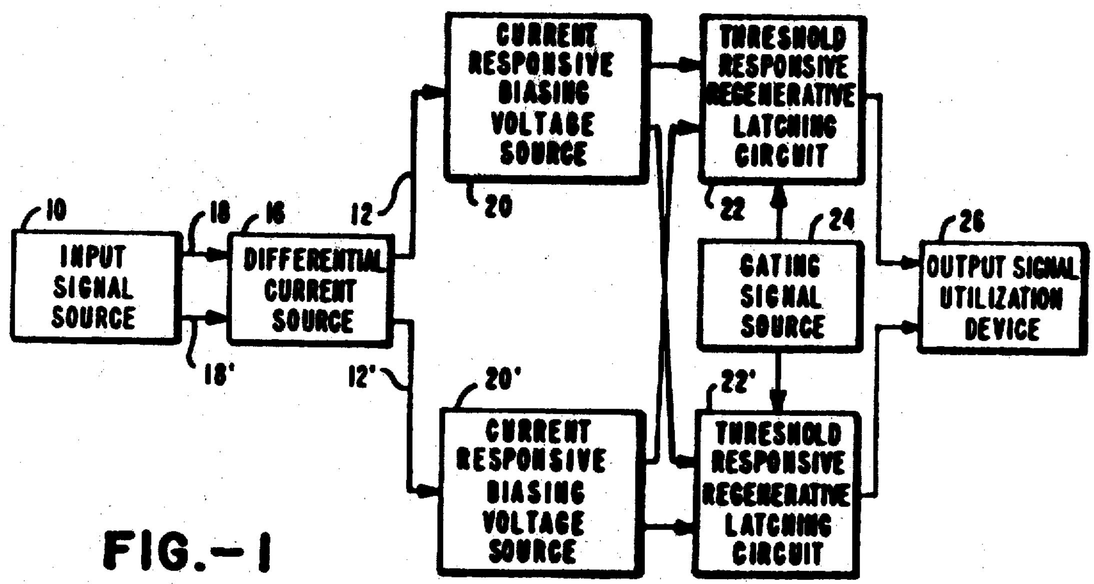
FIG. 1 is a block diagram of a preferred arrangement of a sensing circuit in accordance with the invention; and, FIG. 2 is a schematic diagram of one particular circuit in accordance with the arrangement of FIG. 1 shown in connection with a portion of a core memory.

One preferred form of sensing circuit in accordance with the invention is illustrated in block diagram form in FIG. 1. In the FIG. 1 arrangement an input signal source 10 is coupled to differentially vary the currents in two different paths 12, 12' from a current source 16. The input signal source 10 may comprise any appropriate device such as a core memory, thin film memory, or read-only memory (ROM) for providing input signals to be sensed to the exclusion of noise and other unwanted signals. The input signals from the source 10 are assumed to be bipolar in their nature, and accordingly the differential current source 16 is illustrated in FIG. 1 as having two different inputs 18 and 18'. However, as will become more fully apparent from the discussion to follow the invention may also be used with unipolar input signals.

The differential current source 16 maintains the total current flowing through the two different paths 12, 12' at a relatively constant value. Upon application of an input signal of one polarity to the differential current source 16 via the input 18, the current in the path 12 increases by an amount directly related to the amplitude of the input signal and the current in the path 12' decreases by a substantially equal amount. Similarly when an input signal of opposite polarity is applied via the input 18', currents in the paths 12' and 12 respectively increase and decrease by amounts dependent on the input signal amplitude.

The current path 12 includes a current-responsive biasing voltage source 20 for respectively providing first and second biasing voltages to a pair of threshold-responsive regenerative latching circuits 22 and 22' in the paths 12 and 12'. The first and second biasing voltages vary in direct proportion to the value of the current in the path 12. The current path 12' also includes a current-responsive biasing voltage source 20' which is operative to provide third and fourth biasing voltages to the latching circuits 22' and 22 respectively. The third and fourth biasing voltages vary in direct proportion to the current in the path 12'.

With equal currents flowing in the paths 12, 12', the second and fourth biasing voltages are substantially equal in value and exceed the values of the first and third biasing voltages which are also substantially equal. The latching circuits 22 and 22' which are essentially bistable devices assume a first or reset state in the presence of a strobe voltage from a gating signal source 24. Upon application of an input signal at the input 18, the first and fourth biasing voltages respectively increase and decrease due to the resulting changes in the currents in the paths 12, 12'. If the input signal amplitude is at least equal to a predetermined minimum or threshold value, the first biasing voltage from the source 20 increases to a value at least equal to that of the simultaneously decreasing fourth biasing voltage from the source 20', and the latching circuit 22 responds by switching from its first or reset state to a second or set state to provide an output signal to an output signal utilization device 26. The circuit of FIG. 1 responds in similar fashion to an input signal of opposite polarity at the input 18', the third biasing voltage from the source 20' increasing to a value at least equal to that of the simultaneously decreasing second biasing voltage from the source 20 to set the latching circuit 22' and provide an output signal to the device 26 if the input signal amplitude is at least equal to the threshold value. The relative values of the biasing voltages to which each of the latching circuits 22 and 22' is responsive define operational thresholds which are relatively insensitive to common circuit variations as described in connection with FIG. 2 hereafter.

The gating signal source 24 enhances the operation of the circuit for certain applications such as in the sensing of signals read out from a core memory. Thus where a noise signal of relatively large amplitude is likely to precede or follow the desired signal to be sensed, the latching circuits 22 and 22' are effectively inhibited by the source 24 so that they cannot respond except during the time interval in which the desired signal is likely to be present.

The latching circuits 22 and 22' are regenerative in the sense that the two biasing voltages to which each is responsive need only reach a level substantially equal to one another. At this point the circuit 22 or 22' operates to increase the first or third biasing voltage insuring that the second state is assumed.

The output signal utilization device 26 may comprise any appropriate arrangement for using the sensed signals from the source 10. The device 26 may distinguish the input signals on the basis of polarity, a signal from the latching circuit 22 indicating that the input signal is positive in polarity and a signal from the circuit 22' indicating that a negative input signal is present. However for most applications of the sensing circuit the polarity of the input signals is unimportant, the primary consideration being that of whether or not an input signal is present during a particular time interval. In such situations the utilization device 26 does not seek to determine polarity but simply responds to the presence or absence of a signal from either of the latching circuits 22 and 22'.

Figure 2:
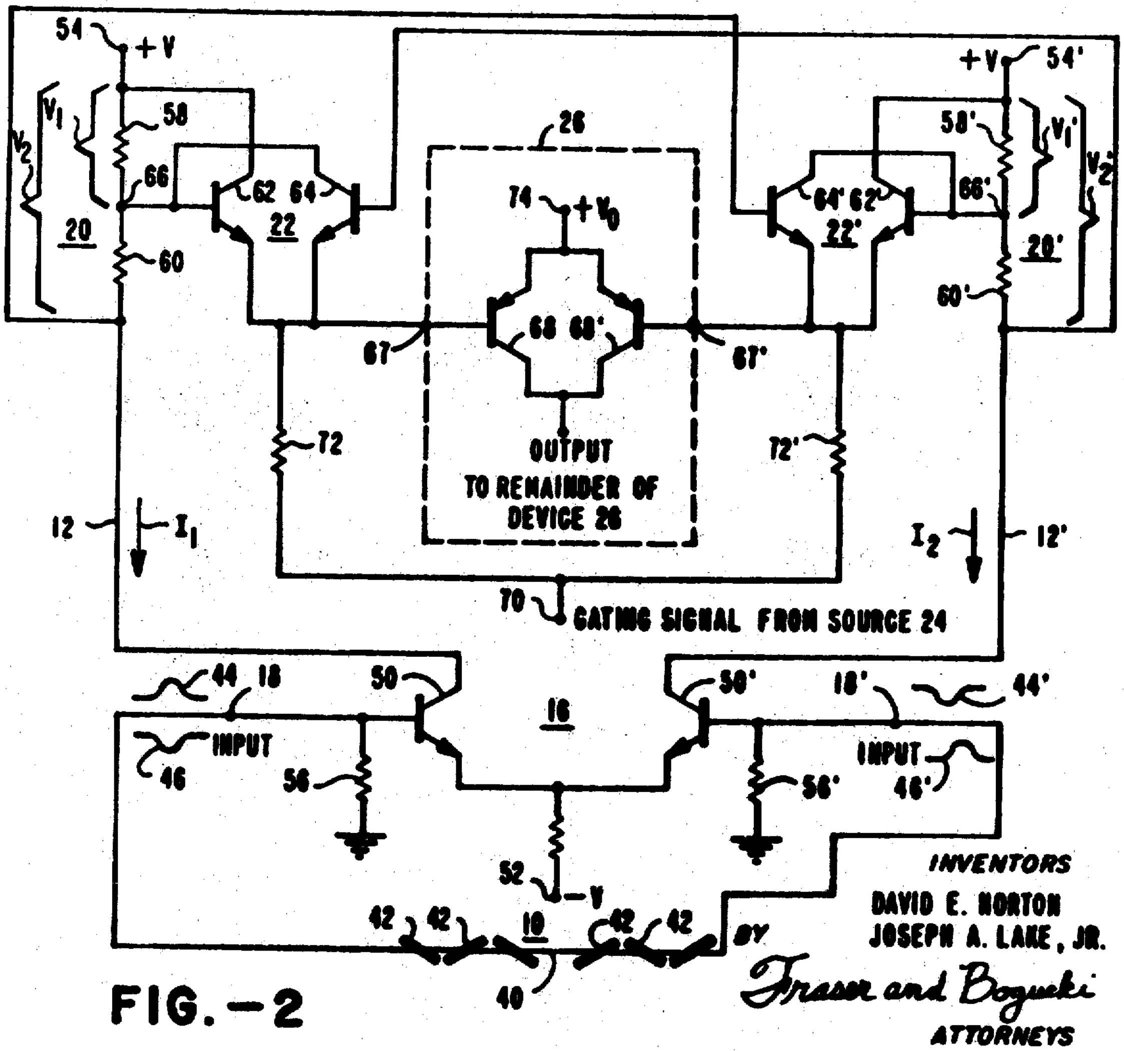

One preferred embodiment of the arrangement of FIG. 1 is schematically shown in FIG. 2 in conjunction with a core memory. The core memory, which in this instance comprises the input signal source 10, includes a line 40 serially coupled between the opposite inputs 18 and 18' of the differential current source 16. The line 40, which may comprise the sense/inhibit line of one particular plane of a three-dimensional core memory, links a plurality of magnetic cores 42 in the memory plane. During writing the line 40 may be used as an inhibit line to prevent switching of the associated cores 42. During readout or interrogation the X- and Y-drive-lines (not shown in FIG. 2) which link a selected one of the cores 42 are driven to determine if the core is in a particular state of magnetization indicating that a "1" is stored therein or in an opposite state indicating that a "0" is stored therein. During this operation the line 40 functions as a sense line to provide an input signal to the opposite inputs 18 and 18' of the differential current source 16 if the interrogated core is in the "1" state. The cores 42 are linked with the line 40 in different senses, and the input signals may accordingly be of either polarity. Thus the interrogation of one of the cores 42 may result in the application of a positive pulse 44 to the input 18 and a corresponding negative pulse 44' to the input 18'. Similarly the interrogation of another one of the cores 42 may result in a negative pulse 46 to the input 18 and a corresponding positive pulse 46' to the input 18'. Exemplary waveforms of the pulses 44, 44', 46 and 46' are diagrammatically illustrated in FIG. 2 adjacent the inputs 18 and 18'.

It should be understood that the core memory is shown and described in FIG. 2 for purposes of illustration only, and that other types of input signal sources may be used in accordance with the invention.

The differential current source 16 in this instance comprises a pair of NPN-transistors 50 and 50' which are respectively coupled to vary the currents flowing in the paths 12 and 12' from a source of constant current comprising a common negative terminal 52 and a pair of positive terminals 54 and 54'. The base terminals of the transistors 50 and 50' are respectively coupled to the inputs 18 and 18' and to ground via resistors 56 and 56'. In the absence of an input signal to the inputs 18 and 18' the levels of conduction in the transistors 50 and 50' are approximately equal and currents $I_1$ and $I_2$ of approximately equal magnitude or value flow in the different paths 12 and 12′ between the positive terminals 54 and 54′ and the common negative terminal 52. If an input signal in the form of a positive pulse 44 at the input 18 and a corresponding negative pulse 44′ at the input 18′ is present however, the resulting changes in the biasing of the transistors 50 and 50′ cause such transistors to respectively increase and decrease in conduction. While the total flow of current between the terminals 54, 54′ and the terminal 52 remains the same, the individual currents $I_1$ and $I_2$ respectively increase and decrease in value, the changes in value being directly related to the amplitude of the input signals 44 and 44′. Similarly an input signal in the form of a positive pulse 46′ at the input 18′ and a negative pulse 46 at the input 18 results in an increase in the current $I_2$ and a corresponding decrease in the current $I_1$, the total current flow in the two different paths again remain constant. The differential variations in the currents $I_1$ and $I_2$ accordingly provide a direct representative of the amplitudes of the input signal as well as of the polarity thereof.

The current-responsive biasing voltage source 20 in this instance comprises a pair of resistors 58 and 60 serially coupled in the first current path 12 between the positive terminal 54 and the transistor 50. The biasing voltage source 20′ likewise comprises a pair of resistors 58′ and 60′ serially coupled in the second current path 12′. The flow of current $I_1$ in the path 12 produces a voltage drop $V_1$ across the resistor 58 and a total voltage drop $V_2$ across both resistors 58 and 60. The corresponding voltage drops across the resistor 58′ and the combination of 58′ and 60′ in the current path 12′ are similarly designated $V_1'$ and $V_2'$ respectively.

The voltage drops $V_1$ and $V_2$ respectively comprise the first and second biasing voltages while the voltage drops $V_1'$ and $V_2'$ respectively comprise the third and fourth biasing voltages. The values of the resistors 58, 58′, 60 and 60′ are constant and the voltage drops thereacross have values which are directly related to or proportional to the respective currents $I_1$ and $I_2$.

The threshold-responsive regenerative latching circuit 22 includes first and second NPN-transistors 62 and 64. The base and collector terminals of the first transistor 62 are coupled to the opposite ends of the resistor 58. The collector terminal of the second transistor 64 is coupled to the first current path 12 at a point 66 between the two resistors 58 and 60 while the base terminal thereof is coupled to the current path 12′ at the end of the resistor 60′ opposite the resistor 58′. The latching circuit 22′ includes third and fourth transistors 62′ and 64′ coupled in a manner similar to the first and second transistors 62 and 64. Thus, the collector and base terminals of the third transistor 62′ are coupled to the opposite ends of the resistor 58′ while the collector and base terminals of the fourth transistor 64′ are respectively coupled to the junction between the resistors 58′ and 60′ and to the end of the resistor 60 opposite the resistor 58. The emitter terminals of the first and second transistors 62 and 64 are coupled to one input terminal 67 of the utilization device 26 and to a common gating terminal 70 via a resistor 72. The emitter terminals of the third and fourth transistors 62′ and 64′ are coupled to the other input terminal 67′ of device 26 and to the common gating terminal 70 via a resistor 72′. A typical device 26 of the sort responding commonly to an input on either terminal 67 or 67′ is partially shown within the dotted rectangle 26 of FIG. 2. It includes transistors 68 and 68′ of the PNP-type which have their emitter terminals coupled to a common source 74 of positive voltage and their collector terminals coupled to the remainder of the output signal utilization device 26.

In the absence of an input signal to the terminals 18 and 18′, the currents $I_1$ and $I_2$ are approximately equal and $V_2'$ exceeds $V_1$ by a substantial amount while $V_2$ exceeds $V_1'$ by a substantial amount. If a strobe voltage is present at the terminal 70, the first and third transistors 62 and 62′ conduct and both latching circuits 22 and 22′ are in their reset state. If the strobe voltage is absent from the terminal 70, however, the transistors 62, 64, 64′ and 62′ have no emitter voltages and none can conduct. The gating signal source 24 therefore selectively inhibits or enables the latching circuits 22 and 22′, a relatively low strobe voltage being applied to terminal 70 to enable one of the transistors in each latching circuit to conduct when an input signal at the terminal 18 and 18′ is to be sensed.

With the first and third transistors 62 and 62′ conducting, the resistors 72 and 72′ provide voltages at the bases of the fifth and sixth transistors 68 and 68′. The voltages are relatively high because of the direct coupling of the collector terminals of the transistors 62 and 62′ to the terminals 54 and 54′, and the transistors 68 and 68′ remain nonconductive.

If an input signal 44 and 44′ of amplitude sufficient to render $V_1$ at least equal to $V_2'$ is present, the second transistor 64 begins to conduct, drawing current from the terminal 54 via the resistor 58. The increased current through the resistor 58 increases $V_1$ to tend to bias the transistor 62 into nonconduction. The regenerative operation of the first and second transistors 62 and 64 continues until the transistor 64 reaches saturation and the transistor 62 is completely cut off. The third and fourth transistors 62′ and 64′ respond in like fashion to an input signal 46 and 46′ of amplitude at least sufficient to render $V_1'$ equal to $V_2$, the transistor 64′ increasing in conduction to further off-bias the transistor 62′ until equilibrium is reached. The regenerative action of the latching circuits 22 and 22′ insures that they will operate in positive fashion to provide an output signal so long as the input signal amplitude is at least equal to the predetermined threshold value. Failure to respond to input signals of amplitude only slightly greater than the threshold or of relatively short duration is thereby avoided.

Conduction of either of the transistors 64 and 64′ biases the associated one of the transistors 68 and 68′ into conduction to provide an output signal to the remainder of the utilization device 26. The resistors 58 and 58′ which are respectively coupled between the transistors 64, 64′ and the terminals 54, 54′ receive a portion of the total voltage drop between the terminals 54, 54′ and the terminal 70 to lower the base voltages of the transistors 68 and 68′ and render them conductive whenever the transistors 64 and 64′ conduct.

When the circuit is to be turned off, the strobe voltage is removed from the terminal 70 rendering all four transistors 62, 62′, 64 and 64′ nonconductive. Such gating action as provided at the terminal 70 is a desirable feature for many applications of the sensing circuit including use with a core memory as shown in FIG. 2. When a particular one of the cores 42 is to be interrogated, for example, the associated X-drive-line is typically driven prior to the driving of the associated Y-drive-line to allow for noise signals to settle out. The gating signal prevents detection of such noise, yet activates the circuit for sensing during a time when the X- and Y-lines are simultaneously driven to insure full readout of the core which is magnetized as a "1".

The presence of the complementary latching circuits 22, 22′ enables input signals of either polarity to be sensed. If signals of only one polarity such as the pulses 44 and 44′ are to be detected, however, the latching circuit 22′ may be eliminated. Similarly, the resistor 60 may be eliminated in such an arrangement since only the biasing voltages $V_1$ and $V_2'$ are needed to operate the latching circuit 22. In this case resistor 58′ and 60′ may be replaced by a single resistor having the same value as the sum of 58′ and 60′.

It will be seen that the voltages drops across the resistors 60 and 60′ when $I_1=I_2$ defines the operational threshold of the circuit. The threshold voltage for the latching circuit 22, $V_T$, may accordingly be defined as being equal to $V_2'-V_1$, and similarly the threshold voltage $V_T'$ for the latching circuit 22′ may be defined as $V_2-V_1'$. If the increase in the current $I_1$ and corresponding decrease in the current $I_2$ for input signals 44 and 44′ is termed Δ1, then the resulting change in the biasing of the second transistor 64 is equal to $\Delta I(R_{60'}+R_{58'})$ and the change in the biasing of the first transistor 62 is equal to $\Delta I(R_{58})$. When $\Delta I(R_{58}+R_{58'}+R_{60'})$ is approximately equal to $I_2R_{60'}$, the second transistor 64 begins conducting to change the state of the latching circuit 22 in regenerative fashion in the manner previously discussed. The resistors 58 and 58' are preferably of equal value and the resistors 60 and 60' are also preferably of equal value to provide symmetry of operation and thresholds $V_T$ and $V_T'$ which are equal.

The thresholds $V_T$ and $V_T'$ vary linearly with the total current flowing in the two paths 12 and 12' since the values of the resistors 60 and 60' are constant. Therefore, in the absence of any corrective action, an increase in the total current of, for example, 5 percent would result in a corresponding increase in the operational threshold by 5 percent. This would appear to involve an increase in the minimum acceptable amplitude of input signals which will be sensed. In actual practice, however, it has been found that an increase of 5 percent in the total current will result in an increase of the minimum acceptable input signal amplitude which is more on the order of 1 percent to 2 percent because of the resulting change in the gain of the differentially coupled transistors 50 and 50'. The gain of each of the transistors 50 and 50' can be represented in simplified fashion as the product product of a constant times the current therethrough. As the total current increases, the resulting increase in the gain of the transistors 50 and 50' provides a greater differential change $\Delta I$ in the current for an input signal of given amplitude. Because of the relatively slight effect of common mode variations on the threshold in circuits in accordance with the invention, the need for complex circuitry or componentry to compensate for such problems is eliminated.

While the invention has been particularly shown and described with reference to a preferred embodiment thereof, it will be understood by those skilled in the art that various changes in the form and details may be made therein without departing from the spirit and scope of the invention.

What is claimed is:

1. A circuit for detecting bipolar input signals of amplitude at least equal to a selected minimum value, comprising:

a source of constant current;

first and second current paths coupled to the constant current source, said source normally providing currents of substantially equal value in the first and second paths;

means responsive to the bipolar input signals and coupled to the first and second current paths to differentially vary the currents therein in accordance with the amplitude and polarity of the input signals, an input signal of one polarity providing an increase in the current in the first path and a corresponding decrease in the current in the second path, and an input signal of opposite polarity providing an increase in the current in the second path and a corresponding decrease in the current in the first path;

first and second resistors serially coupled in the first current path;

third and fourth resistors serially coupled in the second current path;

a first transistor having collector, base and emitter terminals, the collector and base terminals being coupled to the opposite ends of the first resistor;

a second transistor having collector, base and emitter terminals, the collector terminal of which is coupled to the first current path between the first and second resistors and the base terminal of which is coupled to the second current path at the end of the fourth resistor opposite the third resistor;

A third transistor having emitter, base and collector terminals, the collector and base terminals being coupled to the opposite ends of the third resistor;

a fourth transistor having emitter, base and collector terminals, the collector terminal of which is coupled to the second current path between the third and fourth resistors and the base terminal of which is coupled to the first current path at the end of the second resistor opposite the first resistor;

a common terminal coupled to the emitter terminals of the first, second, third and fourth transistors; and means for periodically applying a voltage of selected value to the common terminal to permit either of the first and second transistors to conduct and either of the third and fourth transistors to conduct, conduction of either of the second and fourth transistors providing an indication that an input signal of amplitude at least equal to the selected minimum value is present.

2. A circuit in accordance with claim 1, further including a fifth transistor having emitter, base and collector terminals, the base terminal being coupled to the emitter terminals of the first and second transistors and the emitter terminal being coupled to a power supply, said fifth transistor being biased into conduction by conduction of the second transistor to provide an output signal at the collector terminal thereof; and further including a sixth transistor having emitter, base and collector terminals, the base terminal being coupled to the emitter terminals of the third and fourth transistors and the emitter terminal being coupled to the power supply, and sixth transistor being biased into conduction by conduction of the fourth transistor to provide an output signal at the collector terminal thereof.

3. A circuit for detecting input signals of value at least equal to a selected minimum value, comprising:

means including a pair of current paths and responsive to an input signal to differentially vary currents in the pair of current paths according to the value of said input signal;

first resistor means coupled in one of the pair of current paths and responsive to the current flowing therein to provide a first biasing voltage;

second resistor means of value different from the first resistor means coupled in the other one of the pair of current paths and responsive to the current flowing therein to provide a second biasing voltage;

a first transistor coupled across the first resistor means and responsive to the first biasing voltage to conduct to an extent determination by the value of the first biasing voltage; and a second transistor coupled between the first resistor means ans the second resistor means and responsive to the second biasing voltage to conduct an extent determined by the value of the second biasing voltage, said first and second transistors being normally respectively conductive and nonconductive and being biased respectively into nonconduction and conduction whenever an input signal of value of at least equal to the selected minimum value is present.

4. A circuit in accordance with claim 3, wherein the coupling of the second transistor to the first resistor means is such that the conductive path of the second transistor includes the first resistor means, whereby conduction of the second transistor increases the current flowing through the first resistor means to further bias the first transistor into nonconduction.

5. A circuit for detecting input signals of amplitude at least equal to a selected minimum value, comprising:

first and second current paths coupled to a common source of current;

means coupled to the first and second current paths and responsive to the input signals for differentially varying currents in the first and second current paths in accordance with the amplitude of the input signals;

first resistor means serially coupled in the first current path;

second resistor means serially coupled in the second current path;

a first transistor having collector, base and emitter terminals, the collector and base terminals being coupled to the opposite ends of the first resistor means; and a second transistor having collector, base and emitter terminals, the collector terminal being coupled to the base terminal of the first transistor, the base terminal being coupled to the second current path at one end of the second resistor means and the emitter terminal being coupled to the emitter terminal of the first transistor.

6. A circuit for detecting bipolar input signals of value at least equal to a selected minimum value, comprising:

means including a pair of current paths and responsive to said input signals to provide currents in the paths which are differentially varied in accordance with the polarity and value of said signals;

first and second resistors serially coupled in one of the pair of current paths;

third and fourth resistors serially coupled in the other one of the pair of current paths;

a first transistor coupled across the first resistor so as to be biased by a voltage drop across the first resistor resulting from the current in said one current path;

a second transistor coupled to the end of the fourth resistor opposite the third resistor so as to be biased by a voltage drop across the third and fourth resistors resulting from the current in said other one of the current paths;

a third transistor coupled across the third resistor so as to be biased by a voltage drop across the third resistor resulting from the current in said other one of the current paths; and a fourth transistor coupled to the end of the second resistor opposite the first resistor so as to be biased by a voltage drop across the first and second resistors resulting from the current in said one current path, said first and second transistors defining a first bistable circuit which switches from a first state with the first and second transistors respectively conducting and cutoff to a second state with the first and second transistors respectively cut off and conducting whenever an input signal of one polarity having a value of at least equal to the selected minimum value is present, and said third and fourth transistors comprising a second bistable circuit which switches from a first state with the third and fourth transistors respectively conducting and cut off to a second state with the third and fourth transistors respectively cut off and conducting whenever an input signal of the other polarity having a value at least equal to the selected minimum value is present.

* * * * *

PO-1050
(5/69)

UNITED STATES PATENT OFFICE
CERTIFICATE OF CORRECTION

Patent No. 3,617,770 Dated November 2, 1971

Inventor(s) David E. Norton et al

It is certified that error appears in the above-identified patent and that said Letters Patent are hereby corrected as shown below:

Column 8, line 18, "and" should read --said--; line 37, "determination" should read --determined--; line 40, "ans" should read --and--.

Signed and sealed this 18th day of April 1972.

(SEAL)
Attest:

EDWARD M.FLETCHER,JR.
Attesting Officer

ROBERT GOTTSCHALK
Commissioner of Patents